(12) United States Patent
Yu

(10) Patent No.: US 10,030,827 B2
(45) Date of Patent: Jul. 24, 2018

(54) LED LAMP HAVING INTEGRALLY INJECTION-MOLDED HEAT CONDUCTIVE PLASTIC PART AND LOADING POWER SUBSTRATE, AND PROCESS THEREOF

(71) Applicant: ZHUHAI SEPSTAR ELECTRONIC CO., LTD., Zhuhai, Guangdong (CN)

(72) Inventor: Meihua Yu, Guangdong (CN)

(73) Assignee: ZHUHAI SEPSTAR ELECTRONIC CO., LTD., Zhuhai (CN)

( * ) Notice: Subject to any disclaimer, the term of this patent is extended or adjusted under 35 U.S.C. 154(b) by 153 days.

(21) Appl. No.: 14/997,599

(22) Filed: Jan. 18, 2016

(65) Prior Publication Data

US 2017/0184258 A1    Jun. 29, 2017

(30) Foreign Application Priority Data

Dec. 25, 2015  (CN) .......................... 2015 1 1008330

(51) Int. Cl.
| | |
|---|---|
| *F21V 1/00* | (2006.01) |
| *F21K 9/90* | (2016.01) |
| *F21K 99/00* | (2016.01) |
| *F21V 29/85* | (2015.01) |
| *F21S 8/02* | (2006.01) |

(52) U.S. Cl.
CPC ................. *F21K 9/90* (2013.01); *F21K 9/30* (2013.01); *F21V 29/85* (2015.01); *F21S 8/02* (2013.01)

(58) Field of Classification Search
CPC ... F21K 9/90; F21K 9/30; F21V 29/85; F21V 29/89; F21S 8/02; F21S 8/024; F21S 8/026; F21S 8/03; F21S 8/033
See application file for complete search history.

(56) References Cited

U.S. PATENT DOCUMENTS

| | | | | |
|---|---|---|---|---|
| 2011/0095690 | A1* | 4/2011 | Sagal ..................... | B29C 45/14 362/235 |
| 2012/0025708 | A1* | 2/2012 | Choi ..................... | F21V 29/004 315/35 |
| 2012/0306366 | A1* | 12/2012 | Sakai .................... | F21V 23/009 315/51 |
| 2013/0271921 | A1* | 10/2013 | Huan ................... | H05K 1/0203 361/708 |
| 2014/0167076 | A1* | 6/2014 | Lin .......................... | F21V 7/05 362/341 |

\* cited by examiner

*Primary Examiner* — Y M. Lee

(57) ABSTRACT

The present invention relates to an LED lamp having an integrally injection-molded heat conductive plastic part and loading power substrate, comprising a lamp shell and LED modules, the lamp shell being injection-molded from heat conductive plastic material, the LED modules which are connected by injection being provided in the lamp shell; and each of the LED modules comprises an aluminum substrate and a power circuit module, and LED beads are provided on the aluminum substrate and in ON-connection with the power circuit module. Since the LED modules have been connected by injection during the injection of the lamp shell of the LED lamp of the present invention, this may greatly simplify the subsequent assembly processes, significantly improve the production efficiency and obviously reduce the number of operators for assembling.

4 Claims, 3 Drawing Sheets

LED LAMP HAVING INTEGRALLY INJECTION-MOLDED HEAT CONDUCTIVE PLASTIC PART AND LOADING POWER SUBSTRATE, AND PROCESS THEREOF

CROSS-REFERENCE TO RELATED APPLICATIONS

The present application claims the benefit of Chinese Patent Application No. 201511008330.6 filed on Dec. 25, 2015, the contents of which are hereby incorporated by reference.

TECHNICAL FIELD

The present invention belongs to the technical field of LED lighting fixtures, and particularly relates to an LED lamp having an integrally injection-molded heat conductive plastic part and loading power substrate, and a process thereof.

BACKGROUND OF THE PRESENT INVENTION

LED lamps are popular with and accepted by mass consumers due to their advantages of energy conservation and environmental protection, excellent heat dissipation, stable and reliable performance, long service life and the like. LED lamps have been wildly used and gradually replace traditional common energy-saving lamps.

At present, a commercially available LED lamp, for example, a ceiling lamp and a down lamp, includes a lamp shell, an aluminum substrate having LED beads provided thereon, a power circuit module, a reflective cup, a transparent lampshade and a power cap. Since such an LED lamp is constituted of many components which are to be assembled onto the lamp shell one by one, the assembly process is troublesome and time-consuming, the assembly efficiency is quite low, and many operators are required for assembling. As a result, the production cost is greatly increased, and furthermore, since such an LED lamp is assembled manually, it is difficult to guarantee the quality of the lamp. Additionally, the lamp shell of such LED lamps is made of metal material, the cost is high. Meanwhile, high rejection rate of the reflective cup in the evaporation process not only increases the production cost, but also pollutes the environment a lot.

SUMMARY OF THE PRESENT INVENTION

In order to solve the aforementioned technical problems in the prior art, the present invention provides an LED lamp having an integrally injection-molded heat conductive plastic part and loading power substrate, an LED module of which are connected by injection during the injection-molding of the lamp shell and which has greatly simplified subsequent assembly processes, high production efficiency, low production cost, ingenious and simple structure, quite high market competitiveness and promising business success, and a process for processing the LED lamp.

The present invention employs the following technical solutions to solve the aforementioned technical problems.

An LED lamp having an integrally injection-molded heat conductive plastic part and loading power substrate is provided, including a lamp shell and an LED module, the lamp shell being injection-molded from heat conductive plastic material, the LED module which is connected by injection being provided in the lamp shell; and the LED module includes an aluminum substrate and a power circuit module, and LED beads are provided on the aluminum substrate and in ON-connection with the power circuit module.

Further, the LED module further includes a composite support including an upper insulating layer and a lower heat conductive metal layer which are connected by injection; the aluminum substrate and the power circuit module are respectively mounted on the lower heat conductive metal layer and the upper insulating layer of the composite support; and the LED module is arranged within the lamp shell, and circumferential edges of the upper insulating layer and the lower heat conductive metal layer are connected by injection with the lamp shell.

Further, the lamp shell is made of nylon plastic material, the upper insulating layer is made of PBT insulating plastic material, and the lamp shell and the upper insulating layer are connected by injection; and the lower heat conductive metal layer is a heat conductive aluminum sheet support.

Further, the LED lamp is a down lamp, a reflective cup is mounted within the lamp shell of the LED lamp, and a reflective film is pasted on a surface of the reflective cup.

A process for processing the LED lamp having an integrally injection-molded heat conductive plastic part and loading power substrate is provided, including:

first, fixing the lower heat conductive metal layer in an injection mold of the upper insulating layer, and connecting by injection the lower heat conductive metal layer with the upper insulating layer to form the composite support;

then, respectively mounting the aluminum substrate and the power circuit module on the lower heat conductive metal layer and the upper insulating layer of the composite support, and connecting the LED beads on the aluminum substrate with the power circuit module by leads; and forming the LED module; and finally, fixing the LED module into the injection mold of the lamp shell, and connecting by injection the circumferential edges of the upper insulating layer and the lower heat conductive metal layer of the LED module with the lamp shell to form an LED lamp body.

The present invention has the following beneficial effects: with the aforementioned technical solutions of the present invention, the LED module may be connected by injection during the injection of the lamp shell, the subsequent assembly processes are greatly simplified, the production efficiency is significantly improved and the number of operators for assembling is reduced. Meanwhile, since the lamp body is made of heat conductive plastic material, the production cost of the LED lamp is reduced, thereby providing quite high market competitiveness and promising business success. Furthermore, the structure of the LED lamp of the present invention is very ingenious and simple.

BRIEF DESCRIPTION OF THE DRAWINGS

The present invention will be further described as below with reference to the accompanying drawings by a specific embodiment.

DETAILED DESCRIPTION OF THE PRESENT INVENTION

In order to make the objectives, technical solutions and advantages of the present invention clearer, the present invention will be further described as below in detail with reference to the accompanying drawings by an embodiment. It should be understood that the specific embodiment to be described herein is merely used for explaining the present invention, and not for limiting the present invention.

Figure 1:
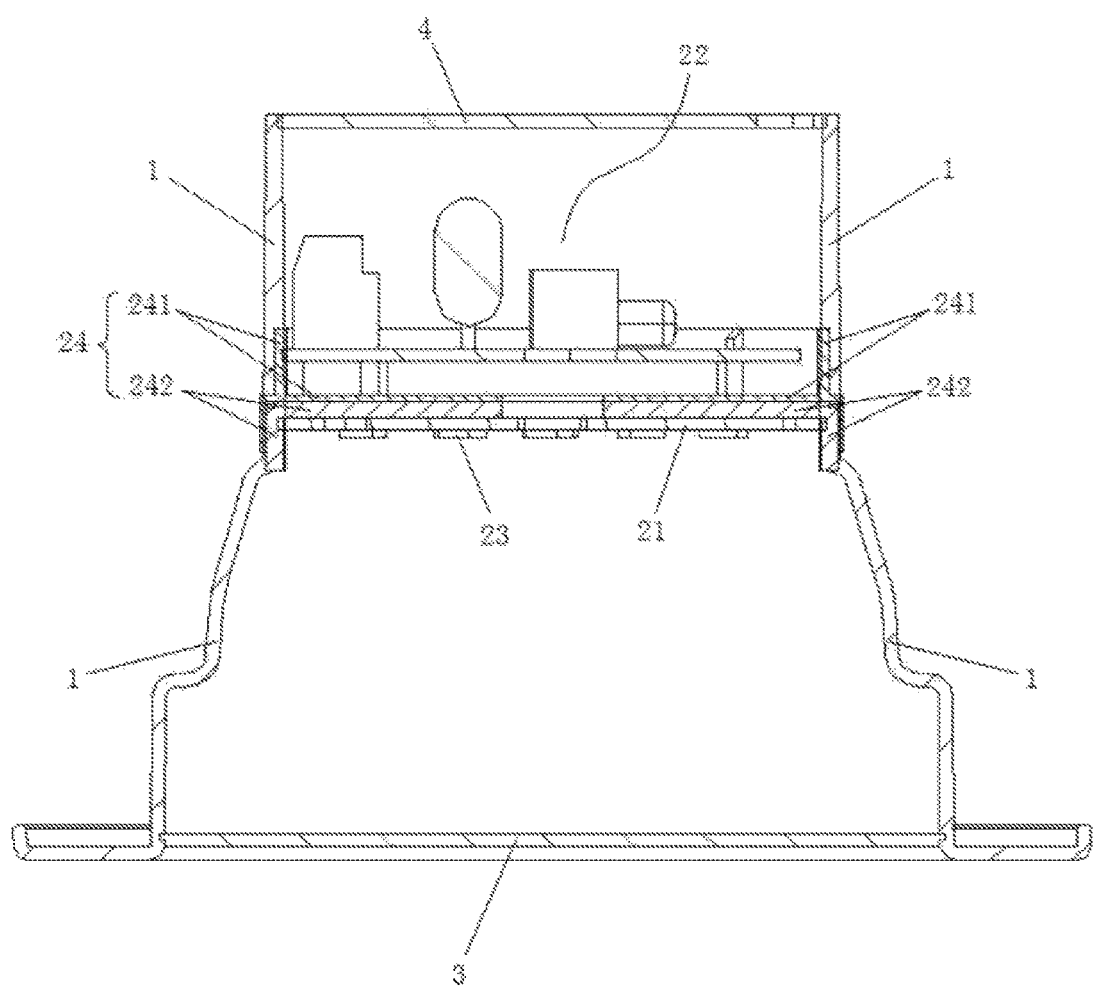
FIG. 1 is a cross-sectional structure diagram of an embodiment of an LED lamp having an integrally injection-molded heat conductive plastic part and loading power substrate according to the present invention.
Figure 2:
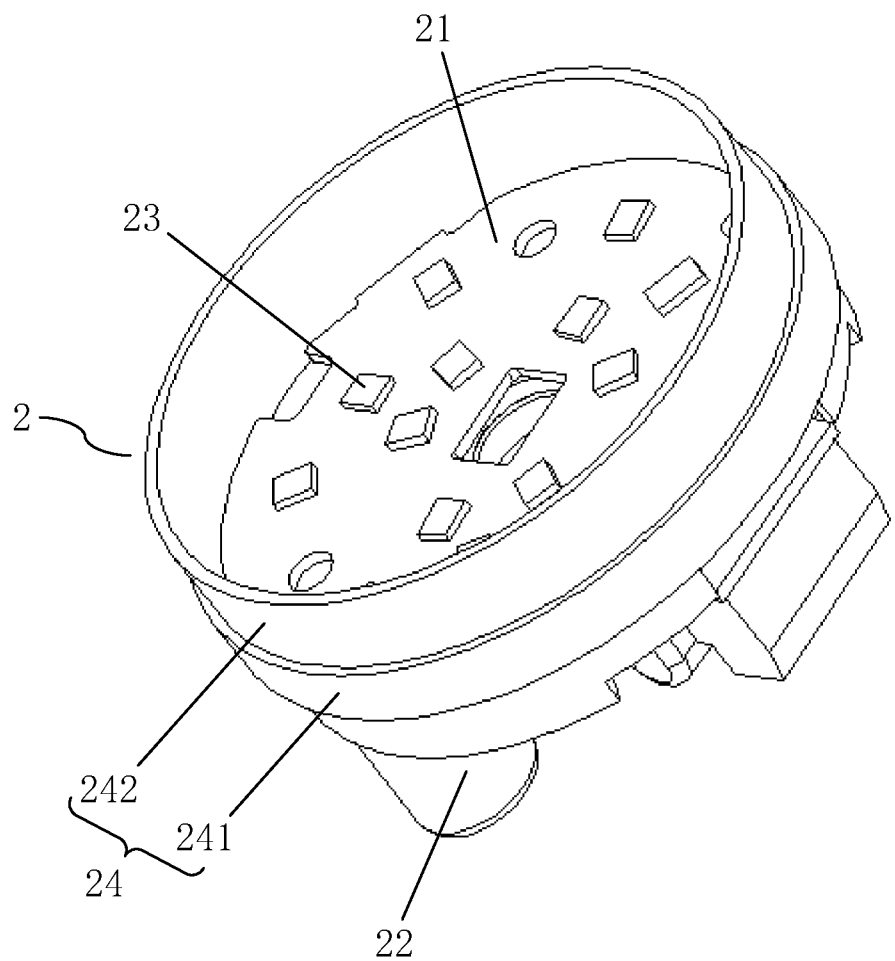
FIG. 2 is a structure diagram of an LED module in the embodiment of the LED lamp having an integrally injection-molded heat conductive plastic part and loading power substrate according to the present invention.

As shown in FIG. 1 and FIG. 2, an LED lamp having an integrally injection-molded heat conductive plastic part and loading power substrate according to the embodiment of the present invention is provided. The LED lamp is a ceiling lamp including a lamp shell 1 and an LED module 2, the lamp shell 1 being injection-molded from heat conductive plastic material, the LED module 2 which is connected by injection being provided in the lamp shell 1; and the LED module 2 includes an aluminum substrate 21 and a power circuit module 22, and LED beads 23 are provided on the aluminum substrate 21 and in ON-connection with the power circuit module 22 by leads (not shown). A specific structure may be as follows: the LED module 2 further includes an aluminum substrate 21, a power circuit module 22 and a composite support 24 comprising an upper insulating layer 241 and a lower heat conductive metal layer 242 which are connected by injection; the aluminum substrate 21 and the power circuit module 22 are respectively mounted on the lower heat conductive metal layer 242 and the upper insulating layer 241 of the composite support 24; and the LED module 2 is arranged within the lamp shell 1, and circumferential edges of the upper insulating layer 241 and the lower heat conductive metal layer 242 are connected by (secondary) injection with the lamp shell 1. The lamp shell 1 is made of nylon plastic material, the upper insulating layer 241 is made of PBT insulating plastic material, and the lamp shell 1 and the upper insulating layer 241 are connected by injection; and the lower heat conductive metal layer 242 is a heat conductive aluminum sheet support.

Figure 3:
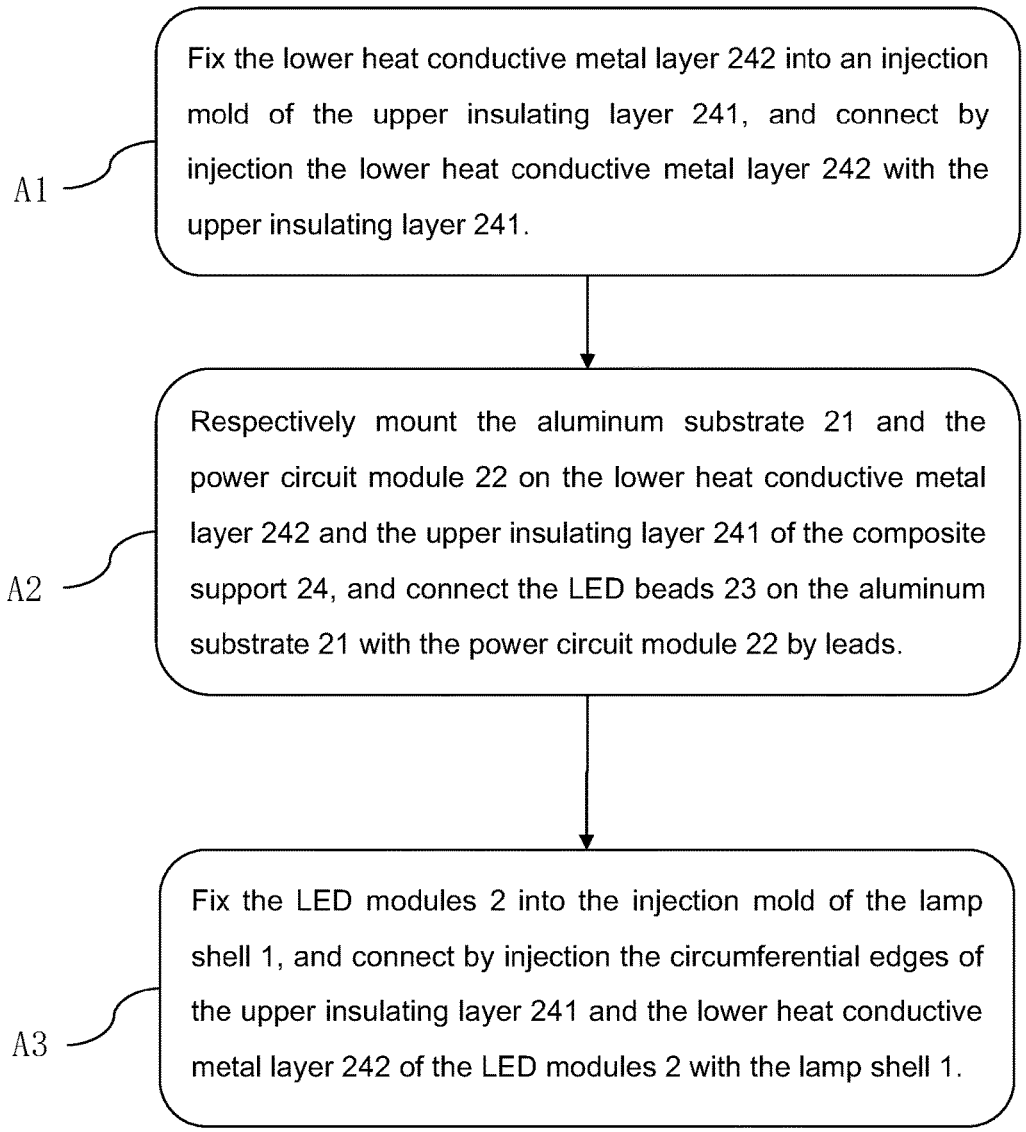
FIG. 3 is flowchart of a process for processing the LED lamp having an integrally injection-molded heat conductive plastic part and loading power substrate according to the present invention.

As shown in FIG. 3, the LED lamp having an integrally injection-molded heat conductive plastic part and loading power substrate according to the present invention is manufactured by the following process, specifically including the steps of:

step A1: fixing the lower heat conductive metal layer 242 into an injection mold of the upper insulating layer 241, and connecting by injection the lower heat conductive metal layer 242 with the upper insulating layer 241 to form the composite support 24;

step A2: respectively mounting the aluminum substrate 21 and the power circuit module 22 on the lower heat conductive metal layer 242 and the upper insulating layer 241 of the composite support 24, and connecting the LED beads 23 on the aluminum substrate 21 with the power circuit module 22 by leads to form the LED module 2; and step A3: fixing the LED module 2 into the injection mold of the lamp shell 1, and connecting by injection the circumferential edges of the upper insulating layer 241 and the lower heat conductive metal layer 242 of the LED module 2 with the lamp shell 1 to form an LED lamp body.

In this way, since the LED module 2 has been connected by injection during the injection of the lamp shell 1 of the LED lamp of the present invention, the subsequent assembly processes may be greatly simplified (it is only required to mount a transparent lampshade 3 and a power cap 4), the production efficiency is significantly improved and the number of operators for assembling is obviously reduced. Meanwhile, since the lamp body 1 is molded from heat conductive plastic material, the production cost of the LED lamp is reduced by over 50%, thereby providing quite high market competitiveness and promising business success. Furthermore, the structure of the LED lamp of the present invention is very ingenious and simple.

Of course, the LED lamp of the present invention may also be other LED fixtures, such as a down lamp, and the aluminum substrate 21 and the power circuit module 22 in the LED module 2 may also be directly fixed in the injection mold of the lamp shell 1 and then connected by injection with the lamp shell 1. Furthermore, in a case where the LED lamp of the present invention is a down lamp, a reflective cup is mounted within the lamp shell 1 of the LED lamp, and a reflective film (not shown) is pasted on a surface of the reflective cup. In this way, the problems of high difficulty and high rejection rate during the traditional evaporation of the reflective cup may be effectively solved, and the cost of products is reduced.

What described above is a preferred implementation of the present invention, and it should be noted that, for a person of ordinary skill in the art, various improvements and modifications may be made without departing from the principle of the present invention, and those improvements and modifications shall also be regarded as falling into the protection scope of the present invention.

What is claimed is:

1. An LED lamp having an integrally injection-molded heat conductive plastic part and loading power substrate, comprising a lamp shell (1) and an LED module (2), the lamp shell (1) being injection-molded from heat conductive plastic material, the LED module (2) being connected by injection being provided in the lamp shell (1); wherein the LED module comprises an aluminum substrate (21) and a power circuit module (22), and LED beads (23) are provided on the aluminum substrate (21) and in ON-connection with the power circuit module (22);

wherein the LED module (2) further comprises a composite support (24) comprising an upper insulating layer (241) and a lower heat conductive metal layer (242) which are connected by injection; the aluminum substrate (21) and the power circuit module (22) are respectively mounted on the lower heat conductive metal layer (242) and the upper insulating layer (241) of the composite support (24); and the LED module (2) is arranged within the lamp shell (1), and circumferential edges of the upper insulating layer (241) and the lower heat conductive metal layer (242) are connected by injection with the lamp shell (1);

wherein all the circumferential edges of the upper insulating layer (241) and the lower heat conductive metal layer (242) are connected by injection with the lamp shell (1).

2. The LED lamp having an integrally injection-molded heat conductive plastic part and loading power substrate according to claim 1, wherein the lamp shell (1) is made of nylon plastic material, the upper insulating layer (241) is made of PBT insulating plastic material, and the lamp shell (1) and the upper insulating layer (241) are connected by injection; and the lower heat conductive metal layer (242) is a heat conductive aluminum sheet support.

3. The LED lamp having an integrally injection-molded heat conductive plastic part and loading power substrate according to claim 1, wherein the LED lamp is a down lamp, a reflective cup is mounted within the lamp shell (1) of the LED lamp, and a reflective film is pasted on a surface of the reflective cup.

4. A process for processing the LED lamp having an integrally injection-molded heat conductive plastic part and loading power substrate according to claim 2, comprising:
- fixing the lower heat conductive metal layer (242) into an injection mold of the upper insulating layer (241), and connecting by injection the lower heat conductive metal layer (242) with the upper insulating layer (241) to form the composite support (24);
- respectively mounting the aluminum substrate (21) and the power circuit module (22) on the lower heat conductive metal layer (242) and the upper insulating layer (241) of the composite support (24), and connecting the LED beads (23) on the aluminum substrate (21) with the power circuit module (22) by leads to form the LED module (2); and
- fixing the LED module (2) into the injection mold of the lamp shell (1), and connecting by injection the circumferential edges of the upper insulating layer (241) and the lower heat conductive metal layer (242) of the LED module (2) with the lamp shell (1) to form an LED lamp body.

\* \* \* \* \*